Dec. 11, 1945.   V. BENDIX   2,390,684
VENEER PRESS
Filed Dec. 5, 1940   5 Sheets-Sheet 1

INVENTOR
Vincent Bendix
BY
Louis Prevost Whitaker
ATTORNEY

Dec. 11, 1945.   V. BENDIX   2,390,684
VENEER PRESS
Filed Dec. 5, 1940   5 Sheets-Sheet 2

INVENTOR
Vincent Bendix
BY Louis Prevost Whitaker
ATTORNEY

Dec. 11, 1945. V. BENDIX 2,390,684
VENEER PRESS
Filed Dec. 5, 1940 5 Sheets-Sheet 4

INVENTOR
Vincent Bendix
BY
Louis Prevost Whitaker
ATTORNEY

Fig. 12.

Patented Dec. 11, 1945

2,390,684

UNITED STATES PATENT OFFICE 2,390,684

VENEER PRESS

Vincent Bendix, South Bend, Ind., assignor, by mesne assignments, to Langley Aviation Corporation, New York, N. Y., a corporation of Delaware Application December 5, 1940, Serial No. 368,577

13 Claims. (Cl. 144—281)

My invention consists in the novel features hereinafter described and illustrated in the accompanying drawings, and my said invention is fully disclosed in the following description and claims.

The object of my invention is to provide means for permanently uniting layers of plywood or other laminated material, or other parts, held in assembled relation by adhesive material or plastic, and particularly where the articles to be formed thereof are to be produced in large quantities, that is to say, by mass production, and to provide such means economically while securing extreme accuracy in the production of such articles.

In the accompanying drawings, which illustrate one manner in which I have contemplated carrying my invention into effect, and a slight modification thereof.

In carrying out my invention I employ a press which preferably consists of a lower mold member upon which the veneered or laminated or other parts to be united are assembled and provided with adhesive material on their contacting surfaces, an upper mold member movable with respect to the lower mold member, and an intervening inflatable pressure applying bag, the parts being corelated as hereinafter described, so that when pressure fluid is admitted to the bag, pressure will be applied uniformly to the article, without forming any wrinkles in the bag, and whereby both the upper and lower surfaces of the article may be subjected to either heat or cold, for the purpose of forming and uniting the parts of and setting the article, without necessarily providing an enclosing casing surrounding the members of the press and the article to be formed or treated therein. To this end it is desirable that the lower face of the article shall be supported preferably throughout its entire surface, and that the lower face of the bag shall conform substantially exactly with the upper face of the article, and preferably that the upper face of the bag shall conform to the lower face of the upper mold member, which latter is movable vertically to permit the insertion and removal of the work, and the pressure bag, and is capable of being locked or secured in operative relation to the bag, the work and the lower mold member.

Figure 1:
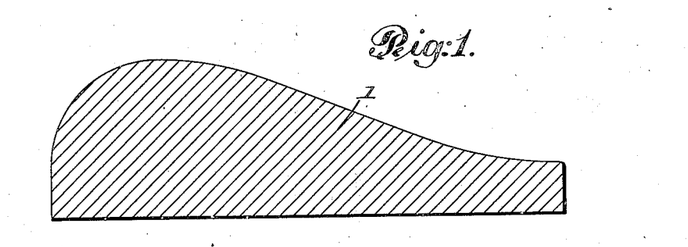
Fig. 1 is a sectional view of a master pattern from which the lower mold member forming part of a press is formed, the upper surface of the pattern being shaped to conform to the lower face of the veneer article or other laminated article which it is desired to produce.
Figure 2:
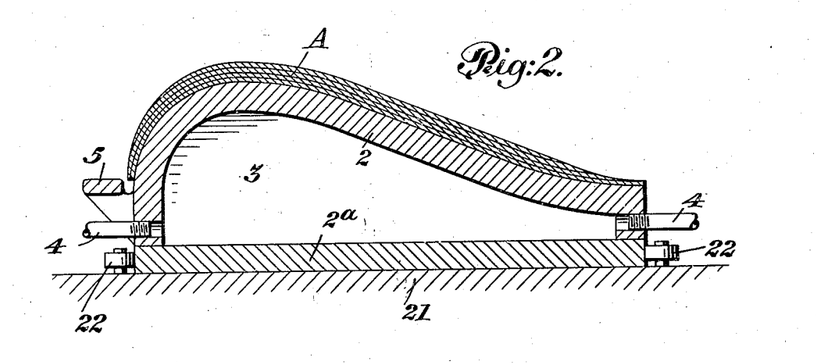
Fig. 2 is a similar view of the lower mold member produced by the aid of the pattern shown in Fig. 1, having applied thereupon an article to be produced, composed or built up of veneers, plywood or other laminated material.
Figure 3:
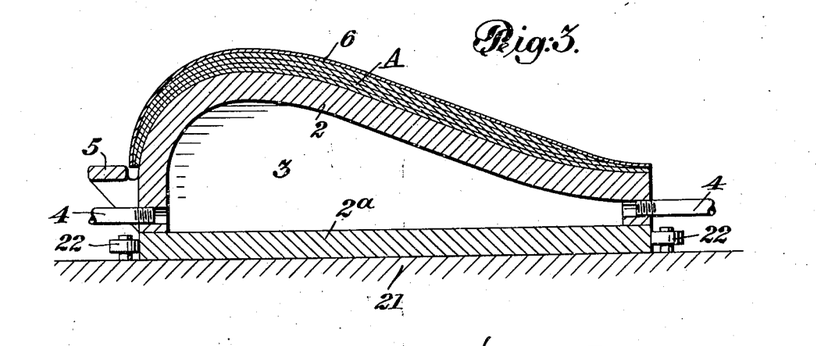
Fig. 3 is a similar view showing a shim applied to the upper face of the article to compensate for the thickness of the lower wall of the pressure applying bag forming part of the press.
Figure 4:
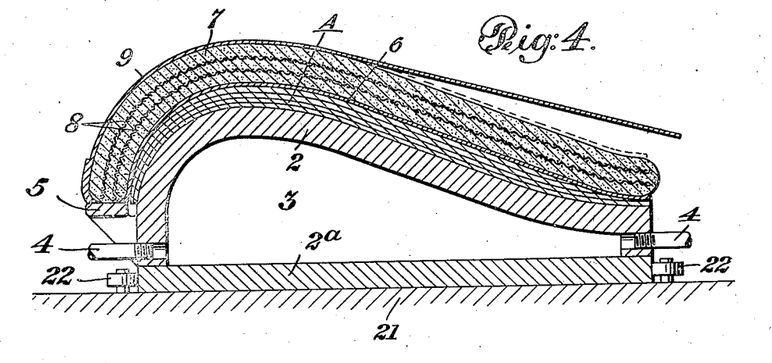
Fig. 4 is a similar view showing a templet molded upon the upper face of the shim illustrated in Fig. 3, and conforming to the shape of the interior of the pressure applying bag, a second shim to compensate for the thickness of the upper wall of the bag being shown partly applied to the upper face of the templet.

In order to accomplish these results I preferably form a master pattern, indicated at 1 in Fig. 1, the upper face of which conforms to the lower face of the article which is to be formed by mass production in the press. This master pattern may be formed of wool plaster or other material from drawings or from the article itself, or from a replica thereof, as may be found most convenient. From the master pattern 1, I cast the lower mold member of the press, indicated at 2, which is preferably formed hollow, as shown in Figs. 2, 3, 4 and 9. The upper face of the lower mold member 2 will obviously conform to the lower or inner face of the article to be produced.

The lower mold member may be made of plaster, metal or other suitable material, but I prefer to make it of some easily moldable metal as lead, which can be melted down and used over again after it is no longer needed, as, where it has become worn or injured, or after the desired production of the particular article is completed.

Figure 9:
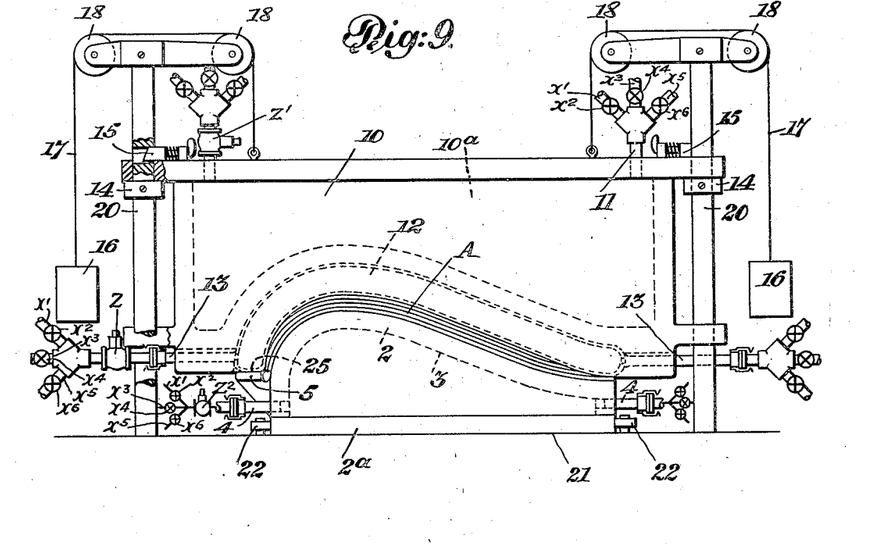
Fig. 9 is an elevation of the press in assembled relation.

The lower mold is preferably formed with interior space, or spaces, to which heating, cooling or refrigerating fluid may be admitted, to facilitate the setting of the articles. In Figs. 2, 3, 4 and 9, the lower mold member 2 is shown hollow, as at 3, and provided with pipes 4, 4 having suitable controlling valves, as shown in Fig. 9, so that the heating or cooling medium can be admitted and discharged or circulated if desired. In some instances I find it convenient to form the mold of two or more parts, suitably united, as indicated in the above mentioned figures, in which the bottom of the mold member 2 is formed by a plate 2a.

At any point or points, where the edge portion of the pressure bag is exposed between the upper or lower mold members when the press is in use, I prefer to provide the appropriate mold member with a bracket or other support, to prevent undue tension on the bag, and in this instance I have shown the lower mold member 2 provided with a bag engaging and supporting bracket 5, for this purpose. Upon the upper face of the master pattern 1, or the lower mold 2, I arrange the laminated material or other parts to be united, with their contacting faces coated with suitable adhesive material or plastic, to form the article to be produced, or I may use a specimen of the article or a replica thereof.

I prefer to form the pressure applying bag so that its lower face conforms directly with the upper face of the article, indicated at A, which obviously may in some cases be of varying thickness in different parts, and therefore may have different contours from those of the upper face of the lower mold member 2. In order to enable the adjacent face of the bag to fit the upper face of the work without wrinkles so as to apply pressure (as well as heat or cold) to every part of the upper surface of the article uniformly, I prefer to form the bag as follows.

I first apply a shim 6 of any suitable material of substantially uniform thickness upon the upper face of the specimen article, or a facsimile thereof, to compensate for the thickness of the lower bag wall, and I then mold upon the shim 6, a template 7, of moldable material, which will harden and form a permanent template for the interior of the bag. For example I may use plaster of Paris or other plastic, reinforced by layers of fabric or wire gauze, or other reinforcing material 8. I also prefer to provide the template 7 with a second shim 9 upon its upper face, to compensate for the thickness of the upper bag wall, although this is not essential.

Figure 5:
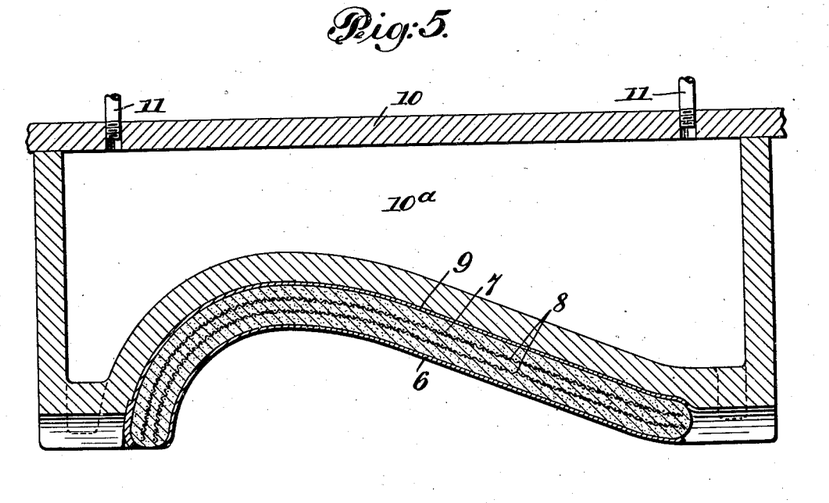
Fig. 5 is a sectional view showing the upper press member or mold member of the press, molded or cast upon the upper face of the upper shim, so that its lower face will conform exactly thereto.

After the template 7 becomes hard and the shim is applied, I cast or mold the upper press member or retaining member 10 thereon, as shown in Fig. 5. While it is not absolutely necessary, I prefer to form this upper press member hollow, as at 10a, and of lead or other metal (although it also may be formed of non-metallic material if desired), and to provide it with pipes 11, 11, having suitable pipe connections and controlling valves, as indicated in Fig. 9.

Figure 6:
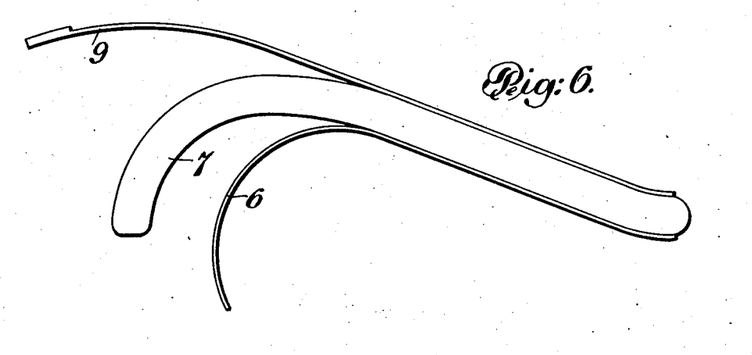
Fig. 6 is a detail sectional view of the templet shown in Figs. 4 and 5, with the shims in process of removal.
Figure 7:
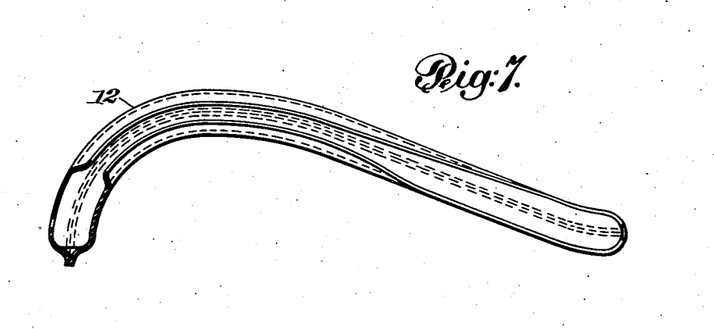
Fig. 7 is an elevation of the bag molded or formed upon the templet.
Figure 8:
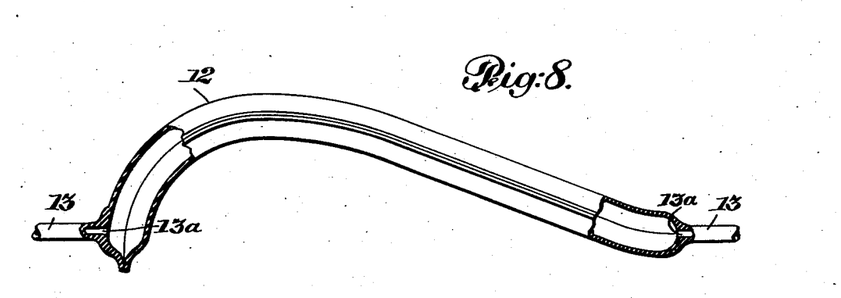
Fig. 8 is a detail elevation of the bag with the templet removed and the bag completed, parts being broken away.

After the upper press member 10 is formed, the shims 6 and 9 are removed from the template 7 (see Fig. 6) in order that the pressure applying bag 12 may be formed thereon, and the bag is formed thereon, the template removed (see Fig. 7) the edges of the bag sealed, and the bag provided with pipes 13, 13 (see Fig. 8), for admission of pressure fluid and/or heating or cooling fluid, as desired, in any usual or preferred manner. As shown in Figs. 7 and 8, the upper and lower walls of the bag, preferably of uniform thickness corresponding to that of the shims 6 and 9, are formed upon the upper and lower faces of the template, and the edges may be fastened or united part of the way around, leaving an aperture at one edge of the bag for the removal of the template, after which this aperture is closed by vulcanizing or otherwise fastening the edges. The pipes 13, 13 may be attached in any desired manner and the bag walls may be formed with apertures 13a to communicate with them. The bag may be formed in any other desired manner, to conform to the template 7 and shims 6 and 9.

Figure 10:
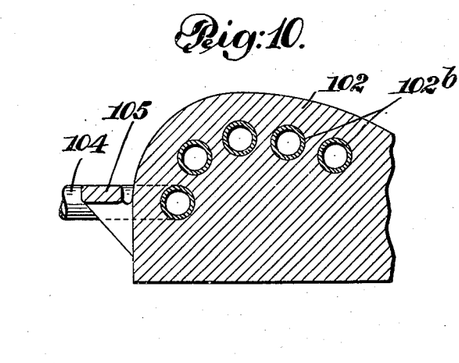
Fig. 10 is a partial sectional view of a slightly modified form of mold member.

It will be understood that, instead of forming them hollow, either the lower or upper mold or press members may be provided with interior pipes to receive or circulate the heated or cold fluid. In Fig. 10 I have shown a lower mold member 102 provided with interior pipes 103 communicating with inlet and outlet pipes, one of which is shown at 104.

Figure 11:
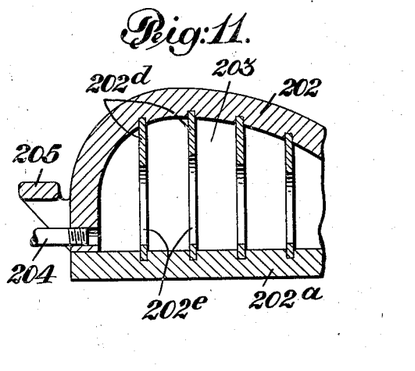
Fig. 11 is a similar view of another slight modification of a mold member.

In Fig. 11 I have shown a lower mold member 202, the upper and lower walls of which are cast upon sheet metal partitions or spacers 202d, having communicating apertures 202e therein, and communicating with pipes 204, and either of these structures can also be used in forming the upper press or mold member, if desired. In the form shown in Fig. 11, the partitions not only provide communicating spaces within the mold for the passage of heating or cooling mediums, but they also reinforce the mold and prevent it from breaking down when subjected to pressure.

In Fig. 9 I have shown one form of the assembled structure, the parts of which are constructed as above described. In this figure I have shown the upper mold member 10 movable vertically on suitable guides 20, provided with stops 14, preferably adjustably secured thereto, for limiting the downward movement of the mold member 10 with respect to the bag, and locking devices, here shown as latches 15 engaging recesses in the guides 20, for locking the upper mold member against upward movement when the bag is inflated or charged with pressure or other fluid. The upper mold member 10 is also preferably provided with counterbalancing means, as weights 16 connected thereto by flexible connections 17 passing over pulleys 18, 18 to facilitate raising and lowering the upper mold member when desired. As indicated in Fig. 9, the lower mold 1 is supported upon a supporting frame or table, indicated at 21, which may be conveniently provided with guiding means, for example, in the form of guiding rollers 22 for determining the position of the lower mold directly below the upper mold and facilitating its withdrawal to place the article to be formed thereon and to remove it therefrom.

In Fig. 9 I have shown the inlet and outlet pipes of the lower mold each provided with a series of pipe connections for connecting them with independent sources of steam, compressed air, and a cooling medium, as cold water, brine or other fluid, each of said pipe connections being provided with an independent control valve, so that the particular fluids may be independently controlled and each may be admitted or discharged from the mold member 1, or circulated continuously therethrough, as may be desired or found most advantageous. In Fig. 9 the connecting pipes for the lower mold member 2 are indicated diagrammatically for convenience. The respective pipe connections are indicated as follows: pipes $x'$ being connected to a steam supply and controlled by valves $x2$, pipes $x3$ being connected to a compressed air supply and controlled by valves $x4$, and pipes $x5$ being connected to a supply of refrigerating fluid and controlled by valves $x6$.

The inlet and outlet pipes 13, 13 of the pressure bag are also provided with similar pipe connections and controlling valves therefor, to which I have given the same reference characters, to assist in controlling pressure and temperature within the mold. The outlet pipes may communicate with the same sources of steam or other heating medium, compressed air and cooling medium, or with circulating pumps or other exhaust means.

In like manner I prefer to provide the pipes 11 of the upper mold member or retaining member, as it may also be called, with similar pipe connections, and controlling valves, which I have designated by the same reference characters as those associated with the lower mold member and bag, and these valve controlled pipe connections of the upper press member will usually be connected to the same sources of steam, compressed air and cooling medium, or exhaust means.

In the use of my improved press, the upper press or mold member is preferably raised above the pressure bag and lower mold member, and held in raised position by the counterbalance means, or by any suitable locking means, if necessary. The lower mold or press member is then preferably drawn out, and the veneers or laminations and other pieces of material for the production of the desired article and corresponding with the article or form used in making the hereindescribed template, are assembled upon the lower mold or press member 2. The contacting faces of the veneers or other materials which are to be united are coated or otherwise provided with adhesive material. This adhesive material may be of any desired kind, but I prefer to employ a phenolic condensation product or analogous artificial resin, which may be applied to the contacting surfaces in liquid or semi-liquid form, or may be obtained in sheet form and laid between the surfaces to be united. Where the surfaces of the article (such as an aircraft wing or part) has an uneven form requiring the bending of the strata or laminated material, the latter may be temporarily secured to the lower press member or mold, by confining bands, or in any other suitable manner. It will also be understood that the article may be built up to different thicknesses at different parts, if desired.

When the parts of the article to be produced (and for which the parts of the press have been specially formed) are assembled and secured in position upon the lower mold or press member, the bag is disposed thereon, while in deflated or partly deflated condition. The lower mold and bag are then moved beneath the upper mold or retaining member, and the latter is lowered into and locked in its depressed position in operative relation to the bag.

The upper and lower mold and the bag are then supplied with heating medium, and pressure medium, so as to apply heat and pressure to the article to be treated, such as to soften or melt the adhesive material and force it into intimate relation with the opposing surfaces of the pieces of veneer, or other material to be united and cause them to adhere closely and permanently together.

I prefer to admit to the lower mold and upper mold if desired, and to the bag, steam which is capable of supplying heat and pressure, for example 30 to 50 pounds per square inch, to both members of the press and the bag. As the bag expands, its lower surface will make contact with the upper face of the article throughout, without wrinkling, and will make similar contact with the lower face of the upper press member, and in this manner the desired pressure can be accumulated within the bag and distributed uniformly over the entire article, since the upper face of the lower press member exactly corresponds to the lower face of the article and the lower face of the bag exactly corresponds with the upper face of the article, thus compressing it to the same extent throughout, and where steam or other heated compressed medium is employed, simultaneously applying the desired degree of heat to both the upper and lower faces of the article to be formed.

I particularly find it convenient to admit a fluid under pressure to the lower and also to the upper member of the press, as this provides for applying the same pressure on the interior of the press members, that is exerted upon their exterior faces by the compressed fluid in the pressure bag, thus opposing or equalizing pressures on the walls of the press members, and relieving them of strain. This enables me to make the molds or press members of comparatively light construction, and avoids the necessity of providing reinforcing means for the same, with a considerable saving of expense.

It will thus be seen that the hollow press member 2 constitutes a pressure chamber the upper wall of which is preformed to provide a die or forming sheet for the material to be molded. The bag 12 backed up by the press member 10 provides an opposed pressure chamber having a rigid backing and an impervious flexible sheet or wall, i. e., the lower wall of the bag 12, adapted to conform to and apply uniform pressure to the material disposed between the die and the conforming sheet.

In order that the article may be subjected to substantially uniform pressure while under treatment, I prefer to provide the outlet pipe or passage for the bag with a pressure regulating valve $z$, and to provide the exit pipes of the upper and lower press members with similar valves $z'$ and $z2$ respectively. These valves may be set for maintaining a definite and preferably uniform pressure in the bag and press members, to permit continuous circulation of fluid, or to compensate for the loss of pressure by partial condensation when steam is used, and permitting the use of liquids as well as gaseous fluids where this is found desirable.

I prefer to maintain the pressure on the article, and where it is not desired to apply heat, I may admit compressed air instead of steam to the bag, and preferably also to the lower press member. I may also admit and circulate both steam and compressed air for the purpose of regulating the temperature to be applied to the article. It will be understood that I may also admit and circulate a heated medium, as steam or hot water to the upper press member, if desired, and this will be found particularly useful where it is desired to subject the article to heat for a considerable time, as the heated upper press member will impart heat to the bag and assist in maintaining the temperature of the heating medium therein, and thus transmit the proper amount of heat to the article and the adhesive material used in connection therewith.

After the article has been treated with heat and pressure for the desired time, I usually find it desirable to treat it with cold to set the adhesive material, and preferably without reducing the pressure to which the article is subjected. By suitably operating the valves connected with the bag, and with the press members, a cold medium, as refrigerated brine or water, may be introduced into them or circulated through them with or without compressed air, so that the pressure on the article is maintained, as the heated medium is displaced and cooling or refrigerating medium substituted.

The effect of the cold or cooling fluid is to set the adhesive material and harden it in situ, thus rendering permanent the connections between the various parts of the article, and also the shaping or forming of the article to conform with the upper face of the lower mold or press member and the lower face of the pressure applying member or bag.

It will be understood that in the use of my hereindescribed invention in mass production, I may employ a series of these presses or parts thereof, of any desired number, all of which can be formed by the aid of patterns for the lower mold member, the article itself, or a facsimile thereof, and the template for the formation of the bag, and preferably the under face of the upper mold or press member in the manner described, it being evident that the additional press members and pressure bags so formed will be exactly the same in every particular as those just described, and that the articles produced thereby in the manner also hereinbefore described, will be identical.

It will also be understood that if it is desirable, I may provide a plurality of the lower press members for each of the upper press members and bag, and that an economy may be thus effected, as the veneers or other material of which the article is formed, suitably treated with adhesive, may be arranged upon one of the lower press members, while another article is being formed, united and set in the press, including another lower press member, and that upon the completion of the article in the press, the lower press member may be removed, the bag separated therefrom and applied to the assembled parts of the article to be produced upon another lower press member, which is then inserted in the pres below the upper press member and the article pressed, formed and set, while the first mentioned article is being removed from the previously used lower press member, and fresh material assembled thereon for the production of another of the articles to be formed.

It will be understood that by connecting the pipes communicating with the various members of the press by flexible connections with other sources of supply, the lower press members may be moved horizontally with respect to the upper press member, to facilitate the removal of the finished article and the placing of the material for another article in operative relation with the bag and upper press member, either upon the same or another of the lower press members, as may be desired.

It will be seen that in the form of press illustrated in Fig. 9, for example, the bag is completely, or substantially completely, enclosed between the upper and lower press members, together with the article to be treated, so that when pressure is applied to the bag, there will be little or no strain upon the walls of the bag, and where, as in Fig. 9, the shape of the bag in conformation to the article to be molded, would otherwise expose a portion of the bag, as indicated at 25 for example, the appropriate mold member, in this case the lower mold member, would be provided with a bracket portion, as indicated at 5, to close the gap between the press members and support the adjacent portion of the bag, as clearly illustrated in this figure. The exact location or form of this bracket and its additional bag engaging surface will naturally depend upon the shape or form of the particular article which is to be formed in the press. It will be understood that in case of injury or wear to the bag or mold, either or both can be readily duplicated in the manner first previously described by the aid of the lower mold member, the article or its facsimile and the template for the bag, in the manner previously described, and additional presses can be added to the production line as and whenever this becomes desirable in the mass production of the particular article.

It will be understood that if the manufacture of the particular article shall be entirely discontinued and the manufacture of a different article is desired, the press members will be prepared in the manner previously described, and those formerly prepared and the use of which is no longer desirable will be disconnected, in which case the mold members if formed of a suitable metal, such as lead for example, may be melted up and the metal used over again in the production of new and different press members, while the templates will of necessity be formed in each case in conformity to the article which is to be produced.

In some instances where the article to be produced is of such form as to permit it, and is of substantially uniform thickness throughout, it may be possible to model or mold the template directly upon the upper surface of the lower mold member and to employ it without shims for the production of the lower face of the upper press member, permitting the necessary expansion of the bag when inflated at the desired pressure to compensate for the thickness of the walls of the bag. I prefer, however, in the interests of absolute accuracy, to form the template and the under surface of the upper mold members by the aid of shims, in the manner previously described. Where the claims refer to the formation of the template to conform to the upper face of the article to be formed, or to the lower face of the upper mold member, it will be understood to mean with or without the use of shims.

It will be seen that in the formation of the articles of veneer or other laminated material, or separate parts to be united in the manner described, by and with a plastic or adhesive material, which are to be permanently united and set in fixed position, any desired pressure may be uniformly applied throughout the entire body of the article by the inflation of the bag itself, so that the pressure may be applied almost instantly and without the necessity of raising any large amount of fluid to the desired pressure, as would be the case if a flexible surface were placed in contact with one or both sides of the article and enclosed within a surrounding casing or chamber, the entire interior of which must be filled with compression fluid at the desired pressure. This economy of time and fluid is also effected with respect to fluid admitted or circulated through to the bag for purposes of heating or cooling the article and the plastic or other adhesive material for uniting the parts thereof, as it is only necessary to supply a sufficient amount of heating or cooling medium at desired pressure to fill the bag itself and maintain the desired temperature and pressure therein. In the operation of my improved press, therefore, there is accomplished an economy in the production thereof, and also an accuracy of operation produced by having the lower and upper surfaces of the article exactly conforming in the finished state to the upper surface of the lower press member and the lower surface of the bag, while the upper surface of the bag preferably conforms to the lower surface of the upper press member. There is also an economy in the operation of the press, both of time and of the various media for heating, compressing and cooling the article, all of which contribute advantageously to the mass production of articles formed thereby.

I wish it to be understood, however, that in some instances it may be found desirable to enclose the apparatus within an outer shell or casing to which heating or cooling fluid may be admitted when desired, for the purpose of co-operating with the operations performed by the press itself.

Figure 12:
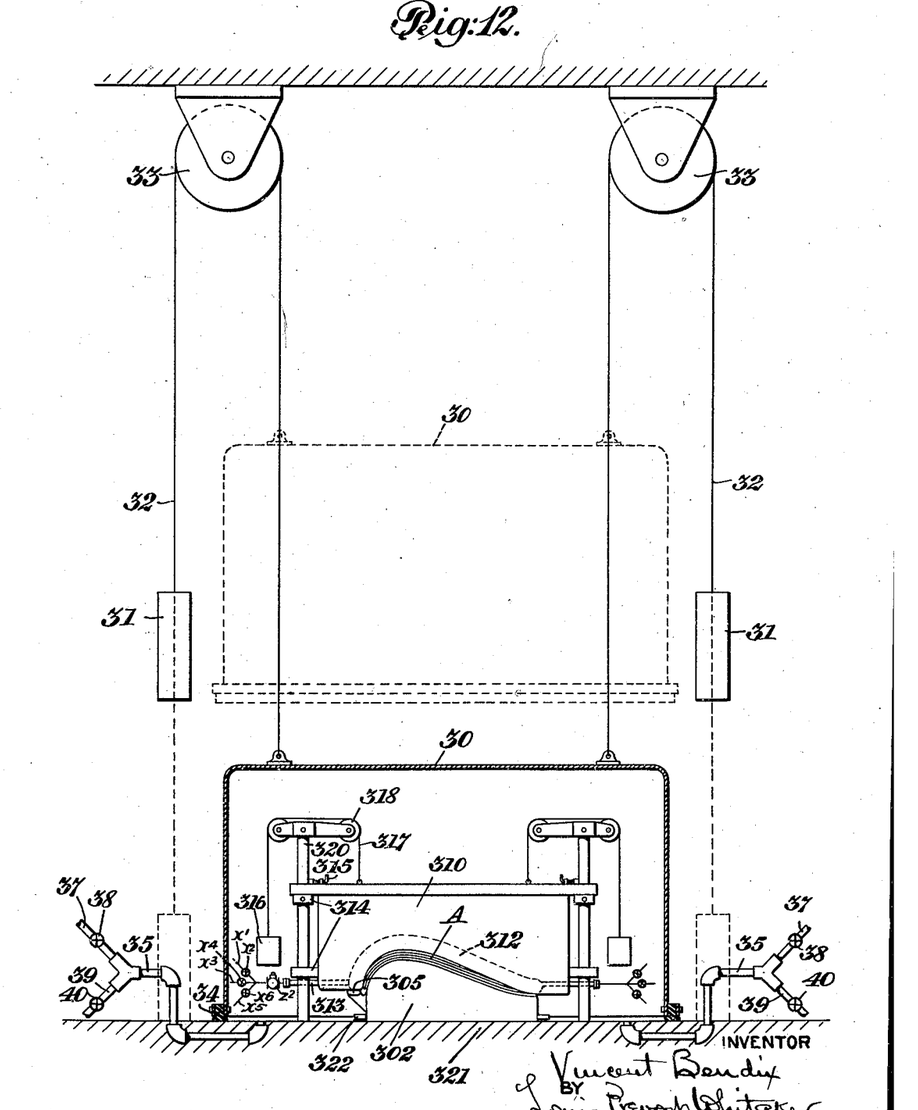
Fig. 12 is a view of a modification in which the entire press is enclosed in a chamber movable out of and into operative relation therewith, and provided with means for connecting with sources of heating and cooling means.

In Fig. 12 I have illustrated a modification in which a shell or housing, indicated at 30, is employed to enclose a press comprising the constructions hereinbefore described, the shell or housing being provided with means for connecting it with sources of heating and also cooling fluids, and the shell or housing itself being capable of being moved into and out of operative relation with respect to the press proper. In the present instance I have shown the shell or housing 30 provided with counterweights 31 connected by flexible connections 32, passing over pulleys 33 with the shell so that the latter can be raised above or lowered into operative relation to completely enclose the press parts previously described, and cooperate therewith. In this instance the lower edge of the shell or casing 30 is provided with a sealing strip, indicated at 34, to engage the table or support on which the press is located, and form a fluid tight connection therewith.

I have also shown the casing 30 provided at opposite sides with pipes 35 for the inlet and outlet respectively, or circulation of heating or cooling fluids when the casing is in its operative position, as shown in this figure. These pipes are conveniently connected with the casing 30 by locating them below the supporting table or surface 321. The pipes 35 are also connected with branch pipes leading to sources of heating and cooling fluids or exhaust means. For example, I have shown in this instance the pipes 35 each provided with branches 27, 37 for the introduction and discharge of steam, hot air, hot water or other heating material under the control of suitable valves 38. The pipes 35 are also shown provided with branch pipes 39 for introducing and discharging a cooling medium as brine, cold air or other suitable medium under the control of valves 40.

By the use of the enclosing casing, it is possible to surround the members of the press with a heating medium, for example, during the time that the article in the press is being subjected to a heating medium through the hollow mold members, 302 and 310, and the bag 312, previously described, in which case the surrounding heating medium within the casing 30 will assist in maintaining the temperature of the heating medium in the hollow mold members and pressure bag. Likewise, when the latter are subjected to a cooling medium, the casing 30 will be supplied with a similar cooling medium surrounding the press members and bag and assisting in maintaining the low temperature desired therein.

It will be understood, however, that in some instances the upper and lower press members, indicated at 302 and 310 in Fig. 12, may be formed solid, that is, without interior spaces, in which case by making these solid press members of suitable metal, the heating or cooling medium admitted to the interior of the casing may be relied upon to supply heat or cold, as the case may be, to the upper and lower mold members of the press, and thereby transmit the heat or cold to the article, A, to be formed. I prefer, however, to provide the lower mold member, and in most cases the upper mold member also, with interior spaces to which the heating or cooling medium may be supplied.

It is to be understood that in some instances it is desirable that the plastic or adhesive material shall be applied to and coat the exterior surface or portions thereof, of the article to be produced, so that it will be absorbed into the veneer or other laminated material forming said exterior surface, when the article is subjected to heat, and will become set or hardened by the application of cold thereto and form a hard coating to protect said exterior surface or portions thereof from moisture or other exterior influences. In such case it will be understood that the contiguous faces of the press members, to wit the bag or the mold member against which the article is forced by the inflation of the bag, or the faces of the article itself to the exterior surface of which the adhesive material or plastic is applied, will be covered with a suitable protecting material to prevent the press members from adhering to the article. This protecting material may be in sheet form or in a finely divided condition or powder, or it may be a liquid or semi-liquid material, and it may be a material to which the coating plastic or adhesive material on the outer surface portions will not adhere, or a material which will adhere to the article but may be removed therefrom after the article is removed from the press.

What I claim and desire to secure by Letters Patent is:

1. In a press of the kind described, the combination with a lower press member of light construction having its upper face conforming to the lower face of the article to be produced, and provided with interior space for the reception of heating and cooling fluids, a pressure bag having its lower face conforming to the upper face of the article to be produced, means for supplying heating and cooling fluid under pressure separately to said bag and to the interior of said press member whereby the pressure inside said press member opposes the pressure of said bag, a confining member for engaging said bag when inflated, and provided with interior space for the reception of heating and cooling fluids, and pipe connections for supplying said fluids separately thereto, and means for securing said confining member in fixed relation to said lower press member.

2. In a press of the kind described, the combination with a lower press member having its upper face conforming to the lower face of the article to be produced, and provided with interior space for the reception of heating and cooling fluids, a pressure bag having its lower face conforming to the upper face of the article to be produced, means for supplying heating and cooling fluid under pressure separately to said bag and to the interior of said press member, a confining member for engaging said bag when inflated and having its lower face conforming to the upper face of said bag, said confining member being provided with interior spaces, and means for supplying heating and cooling fluid separately thereto, a casing for enclosing said press members, and means for providing said casing with heating and cooling fluid separately to stabilize the temperature within said lower press member and confining member and the pressure bag.

3. In a press of the kind described, the combination of a base, a lower press member removably supported on said base in predetermined position and having a contoured work engaging surface for supporting laminae secured thereon to form an assembly of approximately the shape of the article to be molded, said work engaging face conforming to the lower surface of said article, a pressure bag having a work engaging face contoured to conform to the upper surface of the article, a vertically movable upper retaining member for engaging the pressure bag when distended, means for guiding said retaining member in its vertical movement, means for securing said retaining member with respect to said guiding means, said pressure bag being provided with an inlet and outlet, means for connecting said inlet with a source of fluid under pressure, and controlling means for automatically maintaining a predetermined pressure in said bag.

4. In a press of the kind described, the combination of a base, a lower press member removably supported in predetermined position on said base and having a contoured work engaging surface for supporting laminae secured thereon to form an assembly of approximately the shape of the article to be molded, said work engaging face conforming to the lower surface of said article, a pressure bag having a work engaging face contoured to conform to the upper surface of said article, a vertically movable upper retaining member for engaging the pressure bag when distended, means for guiding said retaining member in its vertical movement, means for securing said retaining member with respect to the lower mold member, and means for connecting said bag with a source of pressure fluid to apply pressure to the article being produced and simultaneously applying heat to said article.

5. In a press of the kind described, the combination with a hollow press member of light construction having its upper face contoured to conform to the lower face of the article to be produced, a pressure bag having its lower face contoured to conform to the upper face of said article, a confining member for said pressure bag, said confining member being movable vertically into and out of operative relation to the lower press member to permit the latter to be removed for application of the materials of the article thereto and the removal of the formed article, and means for supplying heating fluid under pressure to said bag and to the interior of said hollow press member to apply heat and pressure to said article and to oppose the pressure on said hollow press member.

6. In a press of the kind described, the combination of a base, an upper press member movable vertically toward and away from said base, means for guiding said upper press member in its vertical movement, means for securing said upper press member in operative position over said base, a lower press member movable horizontally on said base between an operative position under said upper press member, and an assembling and unloading position laterally displaced from said operative position, said lower press member having a contoured work engaging surface for supporting laminae secured thereon to form an assembly of approximately the shape of the article to be molded, said work engaging face conforming to the lower face of said article, a pressure bag associated with said upper press member and having a work engaging face conforming to the upper surface of said article, and means for supplying fluid under pressure to said bag.

7. In a press of the kind described, the combination of a base, an upper press member movable vertically toward and away from said base, means for guiding said upper press member in its vertical movement, means for securing said upper press member in operative position over said base, a hollow lower press member movable horizontally on said base between an operative position under said upper press member and an assembling and unloading position laterally displaced therefrom, said lower press member having a contoured work engaging wall for supporting laminae held thereon to form an assembly of approximately the shape of the article to be molded, the upper surface of said work engaging wall conforming to the lower face of said article, a pressure bag associated with said upper press member and having a work engaging face conforming to the upper surface of said article, and means for supplying pressure fluid to said bag and to said hollow press member, to apply pressure to said article and to oppose the pressure on the work engaging wall of said hollow press member.

8. In a press of the kind described, the combination of a base, a lower press member removably supported in predetermined position on said base and having a contoured work engaging surface for supporting laminae secured thereon to form an assembly of approximately the shape of the article to be molded, said work engaging face conforming to the lower surface of said article, an upper press member movable vertically toward and away from said lower press member, a hollow pressure applying element associated with said upper press member and having a flexible wall contoured to conform to the upper surface of said article, means for guiding said upper press member in its vertical movement, means for securing said upper press member with respect to the lower press member, and means for supplying heated pressure fluid to said hollow element to apply heat and pressure to the article being produced.

9. In a press of the kind described, the combination of a base, a lower press member removably supported in predetermined position on said base and having a contoured work engaging surface for supporting laminae secured thereon to form an assembly of approximately the shape of the article to be molded, said work engaging face conforming to the lower surface of said article, an upper press member movable vertically toward and away from said lower press member, a hollow pressure applying element associated with said upper press member and having a flexible wall contoured to conform to the upper surface of said article, means for guiding said upper press member in its vertical movement, means for securing said upper press member with respect to the lower press member, means for supplying heated pressure fluid to said hollow element to apply pressure to the article being produced and to apply heat to the upper face of said article, and means for simultaneously applying heat to the lower face of said article.

10. Apparatus for molding material involving the application of pressure and heat interchange, including a pair of co-operating press members, one of said press members comprising a preformed metal heat transfer wall constituting a die to support the material to be molded and a support for said die spaced therefrom to provide a pressure chamber therebetween, the opposite press member comprising a wall of impervious flexible material adapted to conform to said preformed metal wall and a rear wall spaced from said flexible wall to provide a pressure chamber, means for securing said respective press members together with the material to be molded therebetween and in direct contact with said preformed heat transfer wall, a pressure line leading to each of said pressure chambers through which heat conveying fluid is conveyed to the respective pressure chambers under pressure, and means communicating with each of said chambers for releasing the fluid pressure therefrom, said preformed heat transfer wall acting to rapidly transfer heat between said fluid and the material being molded, the pressure of the fluid in one chamber acting to neutralize the pressure of the opposite chamber whereby the pressure exerted on the material to be molded will not effect a distortion of said preformed wall.

11. Apparatus for forming articles of moldable material involving the application of pressure and heat exchange, comprising a pressure chamber having a preformed wall constituting a forming die, another pressure chamber having a rigid backing and an impervious flexible conforming wall adapted with said forming die to compress and shape material therebetween, supporting means for said pressure chambers, and means for supplying heating fluid under pressure to one of said pressure chambers and concurrently applying opposing fluid pressure to the other of said pressure chambers.

12. Apparatus for forming articles of moldable material involving the application of pressure and heat exchange, including opposed separable sections, one of said sections comprising a pressure chamber having a preformed wall constituting a forming die, the other of said sections comprising a pressure chamber having a rigid backing and an impervious flexible wall constituting a conforming sheet adapted to cooperate with said forming die to press and shape said material, means for securing said separable sections together with the material to be formed disposed between said die and said conforming sheet, and means for applying fluid pressure to said pressure chambers and simultaneously applying heat to said material.

13. Apparatus for forming articles of moldable material involving the application of pressure and heat exchange, comprising a pressure chamber having a preformed wall constituting a forming die, and opposed pressure chamber having a rigid backing and an impervious flexible conforming wall adapted with said die to apply pressure to and shape material therebetween, and means for supplying heat applying pressure fluid to said first mentioned pressure chamber to apply heat and pressure to said die and concurrently applying opposing fluid pressure to said second pressure chamber and to the conforming wall thereof.

VINCENT BENDIX.